350-96.23 SR

4/7/87 XR 4,656,091

United States Patent [19]

Choi et al.

[11] Patent Number: 4,656,091

[45] Date of Patent: Apr. 7, 1987

[54] INSULATING MATERIAL FOR TELEPHONE CORDS AND TELEPHONE CORDS INCORPORATING SAME

[75] Inventors: Jae H. Choi, Warren Township, Marion County, Ind.; William M. Kanotz, Baldwin; William C. Vesperman, Bel Air, both of Md.

[73] Assignees: AT&T Technologies, Inc., Berkeley Heights; Bell Telephone Laboratories Inc., Murray Hill, both of N.J.

[21] Appl. No.: 822,331

[22] Filed: Jan. 27, 1986

Related U.S. Application Data

[62] Division of Ser. No. 666,640, Oct. 31, 1984, Pat. No. 4,592,955.

[51] Int. Cl.[4] ........................ B32B 9/00; B32B 27/00; G02B 6/44; H01B 7/00

[52] U.S. Cl. ............................ 428/383; 174/120 SR; 350/96.23; 428/379; 428/389; 428/390

[58] Field of Search ............... 428/379, 383, 389, 390, 428/375, 394, 110 AR, 110 SR; 174/120 SR; 350/96.23, 96.30, 96.34; 524/474

[56] References Cited

U.S. PATENT DOCUMENTS

| | | | |
|---|---|---|---|
| Re. 19,019 | 12/1933 | Metcalf | 57/241 |
| 2,418,978 | 4/1941 | Mertens | 260/42 |
| 3,643,004 | 2/1972 | McKean | 174/36 |
| 4,176,240 | 11/1979 | Sobia | 524/474 X |
| 4,259,540 | 3/1981 | Sobia | 350/96.23 |
| 4,324,453 | 4/1982 | Patel | 428/390 X |
| 4,464,013 | 8/1984 | Sobia | 524/474 X |
| 4,497,538 | 2/1985 | Patel | 350/96.23 |

FOREIGN PATENT DOCUMENTS 842479 7/1960 United Kingdom .

*Primary Examiner*—Lorraine T. Kendell
*Attorney, Agent, or Firm*—J. F. Spivak

[57] ABSTRACT

A telephone cord employs as an insulator for the conductors therein an extrudable blend of a styrene-ethylenebutylene-styrene copolymer with polypropylene.

10 Claims, 1 Drawing Figure

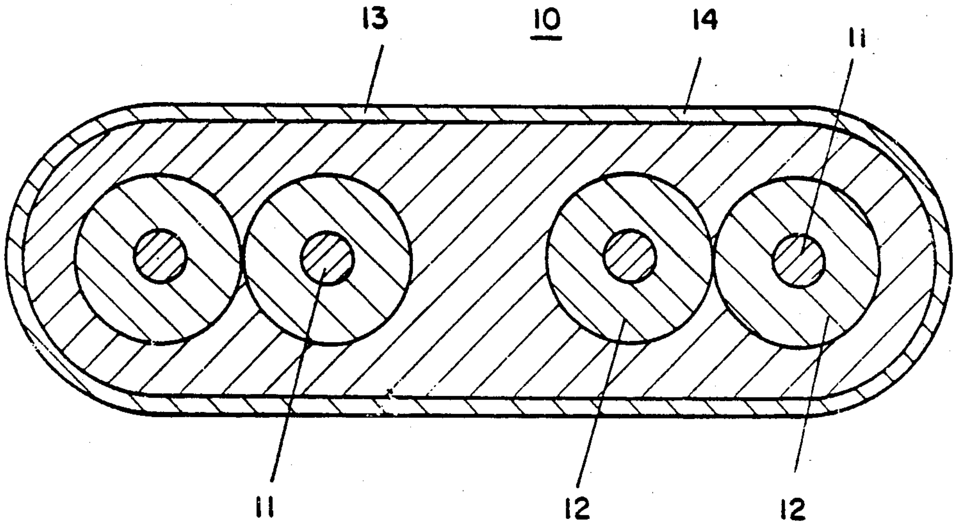
13
10
14
11
11
12
12

INSULATING MATERIAL FOR TELEPHONE CORDS AND TELEPHONE CORDS INCORPORATING SAME

This is a division of application Ser. No. 666,640 filed Oct. 31, 1984, now U.S. Pat. No. 4,592,955.

TECHNICAL FIELD

This invention relates to a low cost styrene-ethylenebutylene copolymer/polypropylene blend composition particularly suitable for use as an insulating material for modular telephone cords.

BACKGROUND OF THE INVENTION

Most telephone users are familiar with what is referred to in the art as the line or mounting cord which extends the telephone circuits from a connecting block, either floor or wall mounted, to a telephone set. The telephone set consists of the housing, and the handset which is connected to the housing by a rectractile cord. Such line and retractile cords may be termed modular telephone cords There has been a significant effort to reduce the cost of these modular telephone cords. However, cost reduction cannot be accomplished at the expense any of the physical, mechanical or electrical requirements set forth for such cordage. One area in which cost reduction can be obtained is by providing a less expensive insulating material for the conductors of the modular telephone cords. Typically, the modular telephone cords have tinned tinsel conductors, individually insulated with a polymeric material such as Dupont's Hytrel 7246 and then jacketed with a PVC resin composition. Jacketing materials for telephone cordage have been discussed, for example, in U.S. Pat. No. 4,346,145.

The development of suitable compositions for the insulating material is complicated by the demanding requirements which telephone cordage must meet. Often, seemingly subtle differences in compositions can make the difference between meeting and not meeting certain requirements or the difference in commercial acceptance and not.

SUMMARY OF THE INVENTION

The present invention contemplates a strand material, e.g., telephone cordage, comprising a plurality of conductors, each conductor covered with an insulating material and the set of insulated conductors covered with an insulating jacket thereover. The conductor insulating material disclosed herein is a blend of a copolymer of styrene and ethylene butylene together with polypropylene In addition to the above-mentioned basic components, the preferred composition includes additives such as color concentrates, peroxide decomposers, stabilizers and antioxidants.

BRIEF DESCRIPTION OF THE DRAWING

The sole FIGURE represents a cross section of a telephone cord employing the novel insulating composition of this invention.

DETAILED DESCRIPTION

The present invention is primarily directed to a polymer composition particularly suitable for use as an insulator for conductors for telephone cordage. It should be understood, however, that while this novel composition was formulated particular for use in the demanding environment of telephone cordage, the composition is also suitable for insulating other electrical wire or other strand material (e.g., optical fibers) as well. Further, the specific construction of the telephone cordage, other than the insulating material composition in accordance with the novel composition, is not critical.

The typical telephone cord 10 of the type described is shown in FIG. 1. The telephone cord 10 comprises a plurality of adjacent conductors 11 which may be flat or round, each conductor 11 having an electrically insulating coating 12 thereover. Generally, this electrically insulating coating 12 is comprised of a blend of a styrene-ethylene butylene-strryene copolymer with polypropylene. The particular amounts of copolymer and polypropylene as well as the melt flow index of the polypropylene employed is critical in achieving an insulating material suitable for meeting all of the test requirements imposed upon telephone cordage. The plurality of coated conductors 11 is covered with a jacket 13 comprising a char-forming, burn resistant, polymeric insulating composition. Any of the known jacketing compositions may be employed. However, the composition as described in U.S. Pat. No. 4,346,145 is preferred. The jacket 13 may then be coated with a protective outer coat 14, e.g., a polymer coat comprised of Goodyear VAR 5825 polyester resin. In the past, the insulating coating 12 was comprised of a polyester-polyether copolymer, e.g., DuPont's Hytrel 7246. This material is a poly[tetramethyleneteraphthalate-co-poly (oxytetramethylene)teraphthalate]. This polyester while suitable for use as an insulating material and meeting all of the requirements for telephone cordage, is relatively expensive. We have now discovered a polymeric formulation that is also suitable for use as telephone cordage in that it also meets all of the requirements for such a use, but is substantially less expensive than the polyester material. More particularly, the novel composition comprises a blend of a styrene-ethylene butylene-styrene (S-EB-S) copolymer together with polypropylene polymers. In order to achieve a composition with the desired physical, mechanical and electrical properties, the amount of each of the components must lie within a specified range. The acceptable range of the S-EB-S polymer in the formulation is from $>10$ to $<20$ weight percent of the final composition. The polypropylene included in the composition is a mixture of a first polypropylene having a melt index (MI) of about 1, and which comprises from $>10$ to $<20$ weight parts of the final composition and a second polypropylene having a MI of about 12 which comprises from $>50$ to $<80$ weight percent of the final composition. The preferred formulation has a composition comprising from about 11 to about 14 weight parts S-EB-S, 12 to 16 weights parts of a polypropylene having an MI of about 1 and about 65 to 75 weight parts of a polypropylene having an MI of about 12. In addition, the preferred composition includes additives such as color concentrate, epoxy resin, antioxidant, peroxide decomposer, stabilizer and inhibitor and a lubricating oil.

Typical additives include, for example, from 2.5 to 4.5 weight percent of a satin silver polyethylene color concentrate such as one made by the Wilson Company and designated as 50GY-70; 0.1 to 0.15 weight parts of an epoxy resin such as Shell's EPON 1004; 0.1 to 0.6 weight parts antioxidant such as Irganox 1010 which is a di-n-octadecyl-3,5-di-tert-butyl-4-hydroxy-benzyl phosphonate; 0.05 to 0.15 parts of a peroxide decomposer such as dilauryl thiodipropionate; 0.01 to 0.10 parts of a copper inhibitor and stabilizer such as Irganox 1024 and from 0.3 to 0.5 weight parts of a high purity naphthenic oil such as Penricho Oil.

Among the general properties that the wire insulation must possess is that the formulation must exhibit good tubing extrusion performance in that the size and thickness of the extrudate must be controllable and uniform and must be essentially free of fractures and discontinuity. It must be free of surface defects and blemishes, such as bubbles and blisters, so as to be essentially free of insulation faults. It must possess good cord fatigue properties as measured by a 150° bend test and good cord mechanical strength. Examples of the evaluation of various compositions are set forth in Table I below.

TABLE I

| Blends | % By Weight | Tubing Extrusion Performance | Tube Insulation Faults at Jacketing* | Cord Fatigue Properties | Cord/Cordage Mechanical Strength | Overall Evaluation |
|---|---|---|---|---|---|---|
| (A) 1 MI PP** | 100 | Good | Frequent | Poor | Fair | Unacceptable |
| (B) 12 MI PP | 100 | Not Extrudable | — | — | — | — |
| (C) S-EB-S | 100 | Not Extrudable | — | — | — | — |
| (D) S-EB-S | 50 | Good | Very Frequent | Good | Poor | Unacceptable |
| 1 MI PP | 50 | | | | | |
| (E) S-EB-S | 50 | Not Extrudable | — | — | — | — |
| 12 MI PP | 50 | | | | | |
| (F) S-EB-S | 13 | Not Extrudable | — | — | — | — |
| 1 MI PP | 87 | | | | | |
| (G) S-EB-S | 13 | Fair | Moderately Frequent | Fair | Good | Unacceptable |
| 12 MI PP | 87 | | | | | |
| (H) S-EB-S | 13 | Very Good | Very Few | Excellent | Excellent | Accepted |
| 1 MI PP | 13 | | | | | |
| 12 MI PP | 74 | | | | | |
| (I) S-EB-S | 8 | Poor | Mildly Frequent | Poor | Good | Unacceptable |
| 1 MI PP | 20 | | | | | |
| 12 MI PP | 72 | | | | | |
| (J) S-EB-S | 20 | Good | Very Frequent | Good | Fair | Unacceptable |
| 1 MI PP | 10 | | | | | |
| 12 MI PP | 70 | | | | | |
| (K) S-EB-S | 10 | Good | Frequent | Poor | Good | Unacceptable |
| 1 MI PP | 10 | | | | | |
| 12 MI PP | 80 | | | | | |

*Defects due to either poor tinsel ribbon spur coverage or wall rupture due to heat & moisture.
**All polypropylenes used are nucleated.

As can be seen from the table, the properties of various compositions cannot be predicted from the individual components. For example, the table shows that pure polypropylene having a melt index of one exhibits good extrusion performance, while polypropylene having a melt index of 12 as well as the S-EB-S copolymer are not readily extrudable. However, Example G shows that a mixture of 87 parts of the polypropylene having a melt index of 12 with 13 parts of the S-EB-S, both components individually being not extrudable, shows a fair extrusion performance. Further, a blend of 50 percent of 1 MI polypropylene with S-EB-S (Example D) shows good extrusion performance while blend F having 87 parts of the extrudable 1 MI polypropylene together with only 13 parts of the non-extrudable S-EB-S is not extrudable. Hence, it would be impossible to predict a suitable composition by merely knowing the properties of the individual components. However, as one can see, it is important to utilize a mixture of a low melt index polypropylene and a high melt index polypropylene in the blend.

The particular S-EB-S component utilized in the newly developed insulation material is part of a family of rubber-styrene block copolymers. Such copolymers are currently manufactured by the Shell Chemical Company under the trade name Kraton G triblock copolymers. A typical Kraton G copolymer comprises the following isomers:

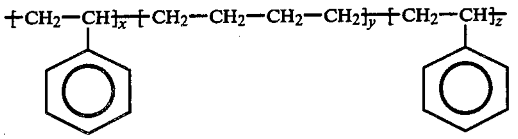

and

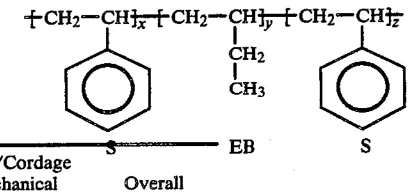

wherein S and EB represent the blocks of styrene and ethylenebutylene polymers, respectively and x, y, and z are the repeat units of the S, EB, and S polymer blocks. The S-EB-S preferred for the novel insulation material generally has block lengths in the neighborhood of 100-25-100, respectively. It was found that copolymers with block lengths of 7-40-7, 10-50-10 and 25-100-25 were too rubbery and soft to be used in the extrusion applications. Hence, it is preferred that the copolymer contain blocks wherein the styrene block length is substantially greater than the ethylenebutylene block length rather than the reverse. It may be noted that the differences in the melt index of the polypropylenes is due to the difference in the molecular weight of these polypropylenes. The higher molecular weight polypropylenes have the lower melt index and are readily extrudable. The low molecular weight or high melt index polypropylene is not readily extrudable but is generally employed for injection molding. A novel blend consisting of the components in the weight percents given as shown in Table II was prepared and extruded to form insulation tubing which was then tested in accordance with the various physical, mechanical and electrical tests.

TABLE II

| S-EB-S/PP | (% Weight) |
|---|---|
| Kraton G 1651[1] | 11.62 |
| PP 5225[2] | 13.64 |
| PP 5864[3] | 70.20 |
| 50GY-70[4] | 3.80 |
| EPON 1024[5] | 0.13 |
| Irganox 1010[6] | 0.04 |
| DLTDP[7] | 0.10 |
| Irganox 1024[8] | 0.04 |
| Penricho Oil[9] | 0.43 |

[1]Poly(styrene-co-ethylenebutylene-co-styrene)
[2]Shell's polypropylene (MFI - 1.0)
[3]Shell's polypropylene (MFI - 12)
[4]Satin silver polyethylene color concentrate from Wilson Company
[5]Epoxy resin
[6]Di-n-octadecyl-3,5-di-tert-butyl-4-hydroxy-benzyl phosphonate as an antioxidant
[7]Dilauryl thiodipropionate as a peroxide decomposer
[8]Copper inhibitor
[9]High purity naphthenic oil Various physical properties of the novel insulation composition were compared with that of the prior art Hytrel 7246 type of insulation covering for conductors. Among the parameters tested were modulus, yield load, tensil force, percent elongation, cut-through, insulation resistance (aged and unaged) and coaxial capacitance (aged and unaged). The criteria which must be met for several of the above-mentioned tests are given below.

The criteria for the tensil force, i.e., the force at which the conductive insulation breaks with the conductors removed, shall not be less than 2 pounds when tested at a pulling speed of 10 inches per minute, using a 6-inch gauge length. In order to ensure a minimum degree of stretching and as a measure of protection against voids and inclusions, the percent elongation of the insulation at the point at which the insulation breaks, with the conductor removed shall be a minimum of 45 percent when tested at a pulling speed of 10 inches per minute using a 6-inch gauge length. The cut-through resistance is a test which assures that the conductor will not cut through its primary conductor insulation during normal customer use. Basically, this test is performed by pushing a specified razor blade or equivalent, perpendicular to the axis of the conductor at a rate of 0.1 inches per minute. The criteria employed is that the blade shall not cut through the conductor insulation at a level of less than 150 grams of force applied to the blade with an average of 36 samples requiring greater than 400 grams. A simple electrical detection circuit is used to determine if the knife blade has contacted the conductor wire within the insulation. The insulation resistance of the conductor insulation must be sufficiently high so that leakage currents do not interfere with central office supervision of the loop current. Insulation resistance is tested with both unaged and aged conductors so as to determine whether there is any degradation in insulation resistance with time and use. The insulation resistance is measured while the wire is immersed in water so as to ensure complete wetting of the surface of the conductor insulation. The period of immersion before measurement is at least 12 hours and the water is made highly conductive by the addition of sodium chloride as per ASTM-D257. The minimum requirement for insulation resistance is 20,000 megohm feet at a temperature of 68° F. (20° C.) The measurement is made with a DC voltage of 250 volts applied for at least 5 minutes across the insulation before reading the insulation resistance value. The value read, in megohms, is multiplied by the immersed length of the sample in water to determine megohm feet. The test is repeated after the insulated wire is exposed for 14 days in a controlled atmosphere chamber at both 90° F. and 90 percent relative humidity as well as 150° F. with no humidity control. The coaxial capacitance limit assures that the insulation has been processed without degrading its dielectric constant and without excessive conductor insulation eccentricity which can increase expected transmission loss. Any length of insulated conductor not less than 20 feet in length, shall conform to the following capacitance requirement while immersed in water under conditions to ensure complete wetting of the surface of the wire. The period of immersion shall not be less than 12 hours. Sodium chloride should be added to the water to assure high conductivity as per ASTM-D257. The coaxial capacitance to water of the insulated conductor shall not be more than 125 pF when measured at a frequency of 1 KHz.

Typical results of the various parameters for the novel blend of insulation and for the prior art Hytrel insulation is given in Table III below.

TABLE III

| Insulation Properties | S-EB-S/PP Blend | Hytrel 7246 |
|---|---|---|
| Modulus (K lb/in$^2$) | 44.8 ± 3.4 | 37.37 ± 2.6 |
| Yield Load (lbs) | 2.20 ± 0.05 | 2.24 ± 0.04 |
| Tensile Force (lbs) | 3.4 ± 0.1 | 3.7 ± 0.6 |
| Ultimate Elongation (%) | 520 ± 20 | 196 ± 40 |
| Cut Through (lbs) | 0.90 ± 0.06 | 1.07 ± 0.14 |
| Insulation Resistance (ohm/10-ft) | | |
| Unaged | $0.25 \times 10^{13}$ | $0.7 \times 10^{12}$ |
| Aged (13 days at 150° F.) | $3.0 \times 10^{14}$ | $1.4 \times 10^{10}$ |
| Coaxial Capacitance (pf) | | |
| Unaged | 48 ± 2 | 80 ± 3 |
| Aged (13 days at 150° F.) | 52 ± 1 | 88 ± 2 |

Similar tests comparing various mechanical, physical and electrical cord properties of a final jacketed telephone cord which incorporates a wire insulation employing the novel blend is compared to one employing the Hytrel 7246 insulation material is given in Table IV below. As can be seen from the table, the cord made with the novel insulation provides at least as good a performances as that with the Hytrel material, with a substantially reduced cost for the novel insulation material.

TABLE IV

| Hytrel 7246 vs S-EB-S/PP Blend Comparison of Cord Properties | S-EB-S/PP Blend | Hytrel 7246 |
|---|---|---|
| Crush (lbs, at 60 mil) | 8.5 | 5.0 |
| Insulation Resistance (ohm-10 ft) | | |
| Unaged | $0.70 \times 10^{13}$ | $0.38 \times 10^{12}$ |
| Aged (13 days at 150° F.) | $0.50 \times 10^{13}$ | $0.27 \times 10^{10}$ |
| 1000-Volt Breakdown | Pass | Pass |
| Ring Test (lbs) | 0.75 | 0.7 |
| Plug Pull-Off (lbs) | 44.00 | 43.00 |
| Aged 150 Bend | | |
| Unaged | 33K ± 8.7K | 28K ± 6K |
| Aged (7 days at 150° C.) | 36.4K ± 0.3K | 22.4K ± 0.2K |
| FCC Thermal Cycle | Pass | Pass |
| FR, UL-62 | Pass | Pass |
| Low Temperature Flex | Pass | Pass |

TABLE IV-continued

| Hytrel 7246 vs S-EB-S/PP Blend Comparison of Cord Properties | | |
|---|---|---|
| | S-EB-S/PP Blend | Hytrel 7246 |
| Pulley (Cycles) | >1000K | >1000K |

What is claimed is:

1. A telephone cord comprising a plurality of insulated conductors and an insulating jacket thereover wherein the conductor insulation comprises an extruded blend of a styrene-ethylenebutylene-styrene copolymer with a mixture of low melt index and high melt index polypropylenes.

2. The telephone cord recited in claim 1, wherein the chainlength of the styrene portion of the copolymer exceeds the chainlength of the ethylenebutylene portion and wherein the copolymer comprises >10 to <20 weight parts of the blend.

3. The telephone cord recited in claim 2, wherein the low melt index polypropylene comprises from >10 to <20 weight parts of the blend and the high melt index polypropylene comprises from >50 to <80 weight parts of the blend.

4. The telephone cord recited in claim 3, wherein the melt indices of the polypropylene are 1 and 12.

5. The telephone cord recited in claim 1, wherein said insulation further compises color concentrate, peroxide decomposer, stabilizer and antioxidant.

6. The telephone cord recited in claim 3, wherein said insulation further comprises color concentrate, peroxide decomposer, stabilizer and antioxidant.

7. A telephone cord comprising conductors having an insulating covering thereover, said covering comprising an extruded blend of from >10 to <20 weight parts of a styrene-ethylenebutylene-styrene copolymer wherein the length of the styrene chain exceeds the length of the ethylenebutylene chain, >10 to <20 weight parts of a low melt index polypropylene and >50 to <80 weight parts of a high melt index polypropylene.

8. The telephone cord recited in claim 7, wherein the melt indices of the polypropylene are 1 and 12.

9. The telephone cord recited in claim 7, wherein the insulating material is extruded from a blend consisting essentially of: 11 to 14 weight parts of the copolymer; 12 to 16 weight parts melt index 1 polypropylene; and 65 to 75 weight parts melt index 12 polypropylene.

10. The telephone cord recited in claim 9, wherein: 2.5 to 4.5 weight parts polyethylene color concentrate; 0.1 to 0.15 weight parts epoxy resin; 0.01 to 0.06 weight parts antioxidant; 0.05 to 0.15 weight parts peroxide decomposer; 0.01 to 0.1 weight parts copper type inhibitor; and 0.3 to 0.5 weight parts naphthenic oil are present in said blend.

* * * * *